United States Patent [19]

Faugeras et al.

[11] 3,947,805

[45] Mar. 30, 1976

[54] DEVICE FOR DETERMINING THE DIRECTION OF A PLANE WAVE

[75] Inventors: Anne Marie Faugeras, Paris; Andre Lambert, Sceaux, both of France

[73] Assignee: Compagnie Industrielle des Telecommunications Cit-Alcatel, France

[22] Filed: Sept. 11, 1974

[21] Appl. No.: 505,009

[30] Foreign Application Priority Data

Sept. 11, 1973 France .............................. 73.32606

[52] U.S. Cl. ............................ 340/6 R; 343/113 R
[51] Int. Cl.² ........................................... G01S 3/80
[58] Field of Search ........ 340/6 R, 16 R; 343/113 R

[56] References Cited
UNITED STATES PATENTS

| | | | |
|---|---|---|---|
| 3,356,989 | 12/1967 | Autrey | 340/6 R |
| 3,691,514 | 9/1972 | Goursolas et al. | 340/6 R |
| 3,792,479 | 2/1974 | Faugeras et al. | 343/113 R |

Primary Examiner—Richard A. Farley
Attorney, Agent, or Firm—Craig & Antonelli

[57] ABSTRACT

Device for determining the direction of a plane wave comprising P detectors regularly spaced out on a rectilinear base, a clock whose frequency is $1/\tau$ and several channels, each connected with a determined direction. The channel $m$ comprises a device sampling all the $m\tau$ signals of the detectors whose outputs are connected to an adder followed by $m-1$ delay cells in series, the output of the last one being applied to the input of the adder. Each adder supplies a signal depending on the difference between the direction $m$ and the direction of the plane wave. Application is to sonars.

5 Claims, 1 Drawing Figure

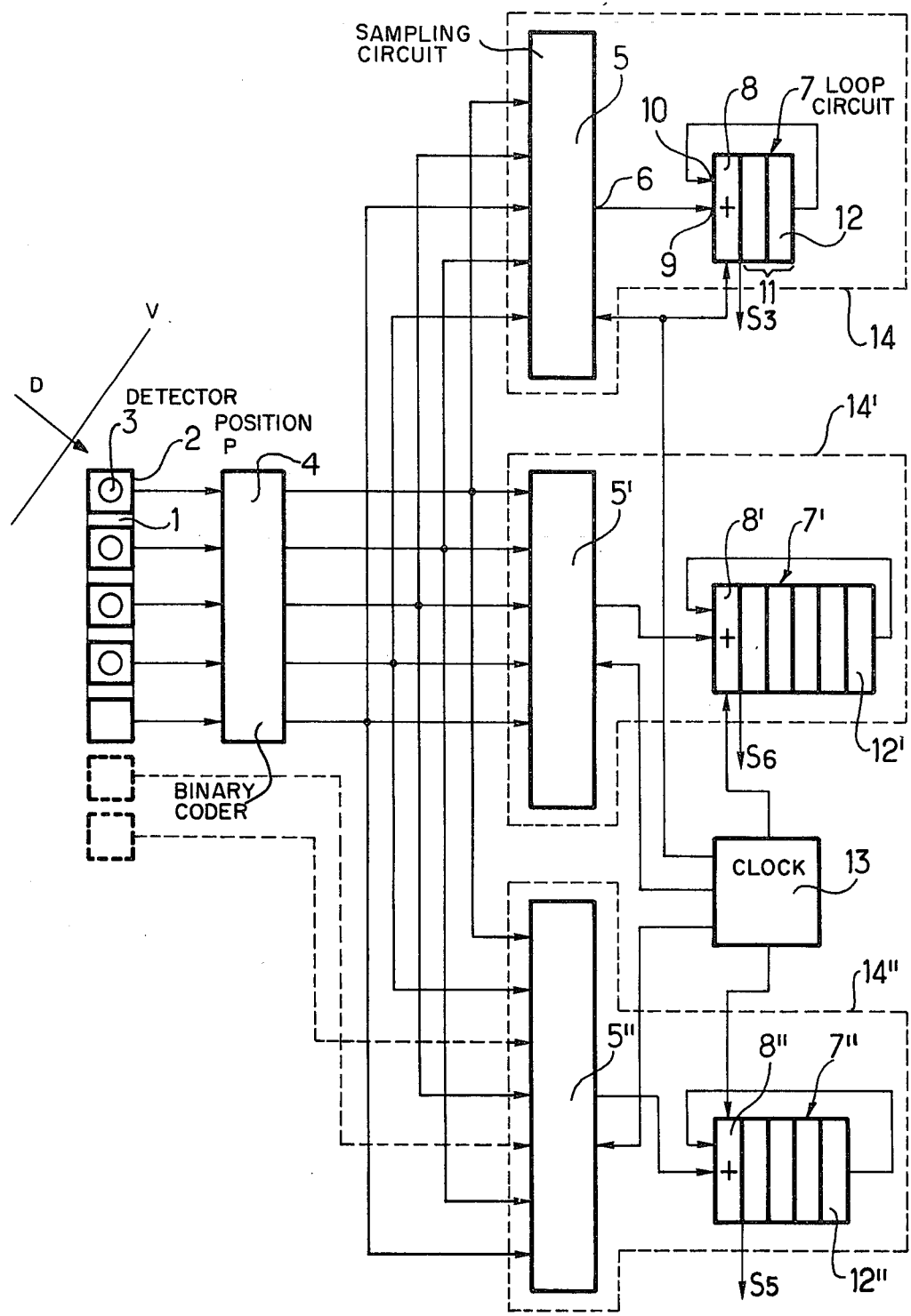

DEVICE FOR DETERMINING THE DIRECTION OF A PLANE WAVE

The present invention relates to a device for determining the direction of a plane wave.

To determine the direction of propagation of a plane wave in an isotropic medium, a method which consists in checking if that propagation is being effected in a predetermined direction or in one of several predetermined directions is frequently used.

According to U.S. Pat. No. 3,691,514 of Sept. 12, 1972, it is a known practice to use detectors supplying analog signals which, after binary coding, are sampled at instants which correspond to the presumed instants of the passing of the plane wave at the level of each of the detectors when the wave moves in the predetermined direction. The sampled signals are then added together and a value corresponding to a predetermined direction is obtained. The values thus obtained for each of the predetermined directions are compared one with another, the maximum value corresponding to the direction which coincides the best with the true direction of the wave.

Such devices are used for example in submarine detection.

Using a rectilinear base comprising P places which are equally spaced out, N of which are taken up by a detector, the periods separating the sampling instants of the signals coming from two successive places are equal, the place without a detector being considered as supplying permanently a zero signal. The sampling instants for a determined propagation direction of the plane wave are determined by a clock sending out a series of pulses whose period is $m\tau$, $\tau$ being the minimum period which it is possible to produce and m being a positive whole number. To effect a measuring relative to a determined direction, the signals coming from the P places must be sampled and added together, so that with conventional devices, the measuring period will be equal to $P \times m\tau$.

The device according to the invention makes it possible to bring that measuring period to the value $P\tau$.

The device according to the invention is characterized in that it comprises:

a rectilinear base, comprising P places numbered from 1 to P regularly spaced on that base, P being a prime number, N of which each comprise a detector (N ≤ P) the P − N others being without a detector;

a clock sending out a sequence of pulses having a frequency of $1/\tau$;

several channels, each corresponding to a predetermined direction;

each of the channels comprising a sampling device to which are applied the signals coming from the places, the output of the sampling device being connected up to the input of a loop, the said loop comprising an adder having two inputs, the first of whose inputs is connected to the output of the sampling device and a delay line constituted by $m - 1$ cells connected together in series, m being a positive whole number which is different for each channel, the input of the first cell being connected up to the output of the adder and the output of the last cell being connected up to the second input of the adder;

binary coding means arranged between the outputs of the places and the inputs of the loops;

the pulses whose frequency is $1/\tau$ coming from the clock used for controlling the sampling devices as well as the progression of the digital signals discharged from the adder C of each channel along the loop of the channel;

the signals depending on the comparison between the direction of the plane wave and the predetermined direction corresponding to m being obtained at the output of one of the elements of the loop of the channel m.

According to one embodiment of the invention, the binary coding means may comprise one binary coding device per channel arranged between the output of the sampling device and the input of the corresponding adder. According to a preferred embodiment of the invention, the binary coding means are constituted by a coding device connected to the outputs of the places.

When m is less than P, the P signals coming from the P places are sampled in a cyclic manner in the following order: signals coming from the places numbered 1, 1+R, 1+2R, . . . , 1+WR, (W being a positive whole number), 1+WR being counted modulo P numerical system having a base of P where R corresponds to the following formula:

$mR = qP + 1$ (q being a positive whole number).

When m is greater than P and is not a multiple of P, the P signals coming from the P places are sampled in a cyclic manner in the following order: signals coming from the places numbered 1, 1+R, 1+2R, . . . , 1+WR, (W being a positive whole number), 1+WR being counted modulo P in a numerical system having a base of P, where R corresponds to the following formula:

$(m - P)R = qP + 1$ (q being a positive whole number or zero).

When m has the form BP (B being a positive whole number) the signals coming from the P places are samples in the following order: signals coming from the places 1, 1+R, 1+2R, . . . , 1+WR (W being a positive whole number), 1+WR counted modulo P' in a numerical system having a base of P', P' being the smallest prime number greater than P, the signals numbered from P + 1 to P' being taken as zero figures (R corresponding to the following formula):

$BPR = qP' + 1$ (q being a positive whole number)
where $BP P'$ and $(B - 1) PR = qP' + 1$ (q being a positive number or zero) where $BP > P'$.

In the device according to the invention, the sampling pulses have a frequency of $1/\tau$ and not $1/m\tau$ as in the state of the art, so that during the time necessary for a measuring in a determined direction corresponding to the channel m, m sampling of the signal coming from each of the places of the base and not a single sampling of each of these signals are effected.

By arranging suitably these samples in the cells of the memory, it is therefore possible to effect m measuring with the device accorrding to the invention during the time necessary for one measuring by the device according to the state of the art.

The following description with reference to the single FIGURE which illustrates an example of a device according to the invention will make it easier to understand how the invention may be implemented.

The device according to the invention comprises a rectilinear base 1 comprising P places such as 2 regularly spaced, numbered from 1 to P, P being a first number, which, in the example illustrated, is equal to 5.

N of these places comprise a detector such as 3, the others comprising none; in the example illustrated, N is equal to 4 and the fifth place is empty.

Each of these places 2 comprises an output connected to an input of a binary coder 4 comprising P inputs to which P outputs correspond. The P outputs of the coder 4 are applied to the P inputs of a sampling device 5 whose output 6 is connected to the input of a loop 7. The loop 7 comprises an adder 8 having two inputs 9 and 10, the first of these inputs 9 being connected to the output 6 of the sampling device 5, and a delay line 11 constituted by $(m - 1)$ memory cells 12 connected in series, $m$ being a positive whole number which, in the example illustrated, is equal to 3. In the example illustrated, the cells are therefore 2 in number. The input of the first cell is connected to the output of the adder 8 and the output of the last cell is connected to the second input 10 of the adder 8.

The cells 12 and the adder 8 are controlled at the rhythm $\tau$ by a clock 13 sending out a sequence of pulses whose frequency is $1/\tau$. That clock 13 also controls the sampling device 5.

The sampling device 5 and the loop 7 comprising $(m - 1)$ memory cells constitute a channel 14.

The P outputs of the coder 4 are connected to several other channels. In the figure, a second channel 14' has been shown comprising a sampling device 5' and a loop 7' comprising an adder 8' and $(m' - 1)$ memory cells 12' (in the example $m' = 6$); and a third channel 14'' has been shown comprising a sampling device 5'' and a loop 7'' comprising $(P - 1)$ memory cells 12'' and an adder 8'' (in the example $P = 5$). All the sampling devices and the loops of the various channels are controlled by the clock 13.

The operation of the device according to the invention is as follows:

When a plane wave V comes from the direction D, the places numbered 1, 2, 3, 4 and 5 are successively reached. Each of the places supplies an analog signal which is applied to one of the P inputs of the binary coder 4. The signal supplied by the fifth place is obviously zero.

The binary signals coming from the coder 4 are applied to all the channels. In the channel 14, the signals coming from P places are applied after binary coding to the sampling device 5 which is controlled by the clock 13. Sampling is effected at the frequency $1/\tau$ and in a certain order, as will be specified subsequently, on the various outputs of the coder 4.

The various samples which are separated by a time $\tau$ leave sequentially on the output 6 and are applied to the input 9 of the adder 8. The adder 8 and the cells 12 are controlled by the clock 13 and the data constituted by the samples at every period of time moves by one element in the loop 7. Thus, by sampling the outputs of the coder 4 in a certain order, the sum of the samples extracted from each of these outputs at instants spaced by $m\tau$, this sum of binary signals being in the form of a digital signal, may be obtained at the output of the adder 8.

In the example illustrated for the channel 14, $m = 3$. The outputs will be sampled in the order 1, 3, 5, 2, 4, 1, 3 . . . corresponding to the places 1, 3, 5, 2, 4, 1, 3 . . .

TABLE I

| | | | | | | | | | | | INSTANTS | | | | | | | | | | | | |
|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| P L A C E S  1 | X | | | | X | | | | | X | | | | | X | | | | X | | | | X | |
| 2 | | | | X | | | | X | | | | X | | | | X | | | | X | | | | |
| 3 | X | | | | | X | | | | | X | | | | | X | | | | | X | | | X |
| 4 | | | | X | | | | X | | | | X | | | | | X | | | | X | | | |
| 5 | | X | | | | | X | | | | | | X | | | | X | | | | | | | X |
| | | | | | | | | | | | | | S3 | | | | | S3 | | | | | S3 | |

In the above table, the various sampling instants separated by $\tau$ have been arranged horizontally and the numbers of the places have been arranged vertically.

In the adder, at the instant 1, the signal coming from the place 1 is obtained; at the instant 4, the signal coming from the place 2 is applied to the input 9 of the adder and the signal coming from the place 1 which has transited through the memory cells 12 is applied to the input 10 so that the sum of the signals sampled at instants differing by 3 $\tau$ coming from the places 1 and 2 are obtained at the output of the adder. At the instant 7, the adder sends out the sum of the samples extracted from the signals coming from the places 1, 2 and 3 at instants spaced 3 $\tau$ apart.

At the instant 13, the adder sends out the sum S3 of the samples extracted from the signals coming from the 5 places at instants spaced 3 $\tau$ apart before being reset to zero.

A new sum S3 of the samples extracted from the signals coming from the 5 places is obtained at the instant 18, then at the instant 23 etc., that is, the sum S3 is obtained every 5 $\tau$.

More generally, the adder sends out, every P $\tau$, a sum signal S3 of the samples extracted from the signals coming from the P places at instants spaced apart by $m\tau$ before being reset to zero. For that purpose, the sampling of the signals coming from the places numbered from 1 to P is effected in the following order: 1, 1+R, 1+2R, . . . , 1+WR (W being a positive whole number), 1+WR being counted modulo P in a numerical system having a base P where R corresponds to the following formula:

When $m < P$, $m R = q P + 1$, ($q$ being a positive whole number or zero) (1).

When $m > P$ and different from BP (B being a positive whole number), the formula giving R is $(m - P) R = q P + 1$ (2).

This latter formula will be applied to the channel 14' for which $m = 6$ and whose loop 7' comprises therefor 5 memory cells 12' behind the adder 8'.

The sampling device 5' and the loop 7' are controlled by the clock 13 since $m$ is greater than $P$, formula (2)

is applied, m being equal to 6, P being equal to 5, assuming that $q = 0$, the result obtained as $R = 1$.

This means that the signals coming from the P outputs of the coder 4 must be sampled in the following order: 1, 2, 3, 4, 5, 1, 2, ... corresponding to the places 1, 2, 3, 4, 5, 1, 2, ....

On re-establishing the table of correspondences between the sampling instants and the sampled places, a check is made to see that a signal whose sum is S6 of the samples drawn off at instants spaced 6τ apart on the signals coming from the 5 places is obtained at every 5τ at the output of the adder 8'.

On referring to table 2, it will be seen that 2 loops — a loop such as 7' comprising 5 memory cells making it possible to obtain a sum of samples extracted at instants spaced apart by 6τ and a loop constituted by an adder followed by no memory cell making it possible to obtain a sum S' of the samples extracted at instants spaced by τ, may be connected with each sampling device such as the device enabling the sampling of the outputs of the places in the following order: 1, 2, 3, 4, 5, 1, 2, ... (such as 5').

More generally, the loop having $m - 1$ cells (forming the channel m) and the loop having $P + m - 1$ cells

TABLE II

|  | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| P L A C E S  1 | X |  |  |  |  | X |  |  |  |  | X |  |  |  |  | X |  |  |  |  | X |  |  |  |  | X |  |  |  |  |
| 2 |  | X |  |  |  |  | X |  |  |  |  | X |  |  |  |  | X |  |  |  |  | X |  |  |  |  | X |  |  |  |
| 3 |  |  | X |  |  |  |  | X |  |  |  |  | X |  |  |  |  | X |  |  |  |  | X |  |  |  |  | X |  |  |
| 4 |  |  |  | X |  |  |  |  | X |  |  |  |  | X |  |  |  |  | X |  |  |  |  | X |  |  |  |  | X |  |
| 5 |  |  |  |  | X |  |  |  |  | X |  |  |  |  | X |  |  |  |  | X |  |  |  |  | X |  |  |  |  | X |
|  |  |  |  |  |  |  |  |  |  |  |  |  |  |  |  |  |  |  |  |  |  |  |  |  | S6 |  |  |  |  | S6 |

Where $m = P$, that is, in the example illustrated, $m = 5$, $P'$ is assumed to be the prime number greater than $P$ and the result than obtained is $m < P'$, $P'$ being chosen in this case as equal to 7. It is sufficient to add fictitiously, on the basis, 2 places ($n° 6$ and $n° 7$ shown in discontinuous lines in the figure) without a detector supplying the zero signals. By transposition of formula (1) with $P'$ in the place of P, the result obtained is $m R = q P' + 1$, assuming that $q = 2$, R is equal to 3.

It is sufficient to sample the places in the following order: 1, 4, 7, 3, 6, 2, 5, 1, 4, ... to obtain a sum signal S5 at every 7τ at the output of the adder 8'' of the channel 14'' corresponding to $m = 5$, that is, comprising 4 cells 12''.

More generally, when $m = P B$ ($B$ being a positive whole number), $P'$ is assumed to be the prime number greater than $P$ and $P' - P$ places without a detector are added fictitiously on the base following the P places.

The $P'$ places are sampled in the sampling device of the channel $P B$ in the order 1, 1+R, ... 1+WR, W being a positive whole number, 1+WR being counted modulo $P'$ in a numerical system having a base of $P'$ with R corresponding to the following formula:

When $B P < P'$.

$$B P R = q P' + 1.$$

When $B P > P'$.

$$(B - 1) P R = q P' + 1.$$

where $q$ is a positive whole number or zero.

As, in the general case where $m$ is different from $P$, the P places must be sampled sequentially without omitting any of them, P should be taken as a prime number so that whatever $m$ may be, the highest common factor of P and of m be 1.

Each channel may be produced in the form of a card, each card comprising a sampling device and a loop constituted by an adder and a delay line having $m - 1$ cells.

(forming the channel $P + m$) may be connected with the sampling device of the channel m (where $m < P$).

The period τ has a lower limit connected with the technology of the circuits used. If that limit leads to a measuring period Pτ greater than the value imposed by the signals to be processed, circumstances lead to the alternate use for each channel, of 2 or more sampling devices each followed by their loop.

Although the device which has just been described appears to afford the greatest advantages for implementing the invention, it will be understood that various modifications may be made therein without going beyond the scope of the invention, it being possible to replace certain of its elements by others capable of fulfilling the same technical function or an equivalent technical function therein.

What we claim:

1. Device for determining the direction of propagation of a plane wave comprising:

a rectilinear base, comprising P places numbered from 1 to P regularly spaced on that base, P being a prime number, N of which each comprise a detector (N ≤ P) the P — N others being without a detector;

a clock sending out a sequence of pulses having a frequency of 1/τ;

several channels, each corresponding to a predetermined direction, each of the channels comprising a sampling device to which are applied the signals obtained from the places P, the output of the sampling device being connected to the input of a loop, the said loop comprising an adder having two inputs, the first of whose inputs is connected to the output of the sampling device and a delay line constituted by $m - 1$ cells connected together in series, $m$ being a positive whole number which is different for each channel, the input of the first cell being connected to the output of the adder and the output of the last cell being connected to the second input of the adder;

binary coding means arranged between the outputs of the places and the inputs of the loops;

the pulses whose frequency is $1/\tau$ coming from the clock used for controlling the sampling devices as well as the progression of the digital signals obtained at the output of the adder of each channel along the loop thereof; and the signals depending on the comparison between the direction of the plane wave and the predetermined direction corresponding to $m$ being obtained at the output of one of the elements of the loop of the channel $m$.

2. Device for determining the direction of propagation of a plane wave according to claim 1, characterized in that the binary coding means are constituted by a coding device connected to the outputs of the places.

3. Device for determining the direction of propagation of a plane wave according to claim 1, characterized in that when $m$ is less than P, the P signals coming from the P places are sampled in a cyclic manner in the following order: signals coming from the places numbered 1+R, 1+2R, . . . , 1+WR, (W being a positive whole number), 1+WR being counted modulo P in a numerical system having a base of P where R corresponds to the following formula:

$m R = q P + 1$ (q being a positive whole number).

4. Device for determining the direction of propagation of a plane wave according to claim 1, characterized in that when $m$ is greater than P and is not a multiple of P, the P signals coming from the P places are sampled in a cyclic manner in the following order: samples coming from the places numbered 1, 1+R, 1+2R, . . . , +WR (W being a positive whole number), 1+WR being counted modulo P in a numerical system having a base of P, where R corresponds to the following formula:

$(m - P) R = q P + 1$ (q being a positive whole number or zero).

5. Device for determining the direction of propagation of a plane wave according to claim 1, characterized in that when $m$ has the form BP (B being a positive whole number) the signals coming from the P places are sampled in the following order: signals coming from the places 1, 1+R, 1+2R, . . . , 1+WR, (W being a positive whole number), 1+WR being counted modulo P' in a numerical system having a base of P', P' being the smallest prime number greater than P, the signals numbered from P + 1 to P' being taken as zero figures R corresponding to the following formula:

$B P R = q P' + 1$ (q being a positive or zero whole number) where $B P < P'$ and $(B - 1) P R = q P' + 1$ (q being a positive number or zero) where $B P > P'$.

* * * * *